United States Patent [19]

Reh et al.

[11] Patent Number: 4,610,865
[45] Date of Patent: Sep. 9, 1986

[54] PROCESS FOR THE PRODUCTION OF POTASSIUM PEROXYMONOSULPHATE TRIPLE SALT

[75] Inventors: Wolfgang Reh, Planegg; Siegfried Schelle, Puchheim, both of Fed. Rep. of Germany

[73] Assignee: Peroxid-Chemie GmbH, Höllriegelskreuth, Fed. Rep. of Germany

[21] Appl. No.: 749,887

[22] Filed: Jun. 27, 1985

[30] Foreign Application Priority Data

Jul. 23, 1984 [DE] Fed. Rep. of Germany ....... 3427119

[51] Int. Cl.$^4$ ................. C01B 15/06; C01B 15/08
[52] U.S. Cl. .................................................... 423/513
[58] Field of Search ........................................ 423/513

[56] References Cited

U.S. PATENT DOCUMENTS

| 2,802,722 | 8/1957 | Stephanou | 423/513 |
| 3,002,813 | 10/1961 | Darbee et al. | 423/513 |
| 3,041,139 | 1/1962 | D'Addieco et al. | 423/513 |
| 3,203,756 | 8/1965 | Hildton | 423/513 |

FOREIGN PATENT DOCUMENTS

| 1080083 | 4/1960 | Fed. Rep. of Germany | 423/513 |
| 1122499 | 1/1962 | Fed. Rep. of Germany | 423/513 |
| 54-147194 | 11/1979 | Japan | 423/513 |
| 797701 | 7/1958 | United Kingdom | 423/513 |
| 597507 | 5/1960 | United Kingdom | 423/513 |
| 979450 | 1/1965 | United Kingdom | 423/513 |

Primary Examiner—Gary Straub
Attorney, Agent, or Firm—Felfe & Lynch

[57] ABSTRACT

The present invention provides a process for the production of the triple salt $2KHSO_5.KHSO_4.K_2SO_4$ from sulphuric acid, hydrogen peroxide and potassium hydroxide, wherein, for continuous production, an aqueous working solution which contains $KHSO_5$, sulphuric acid and potassium sulphate in a molar ratio of 1.3 to 2.5/1.2 to 2.0/1, is concentrated in an evaporation plant under reduced pressure and at a temperature of maximum 40° C. to a concentration which corresponds to a content of 20 to 30% by weight of $KHSO_5$, a partial stream is removed from the concentrated solution and from this, by cooling to a temperature below 15° C., the triple salt is precipitated and separated, the mother liquor obtained is combined with the remaining solution, the solution is reconstituted by the addition of 90 to 100% sulphuric acid, 30 to 90% hydrogen peroxide and concentrated aqueous potassium hydroxide solution and recycled to the evaporation plant.

10 Claims, 1 Drawing Figure

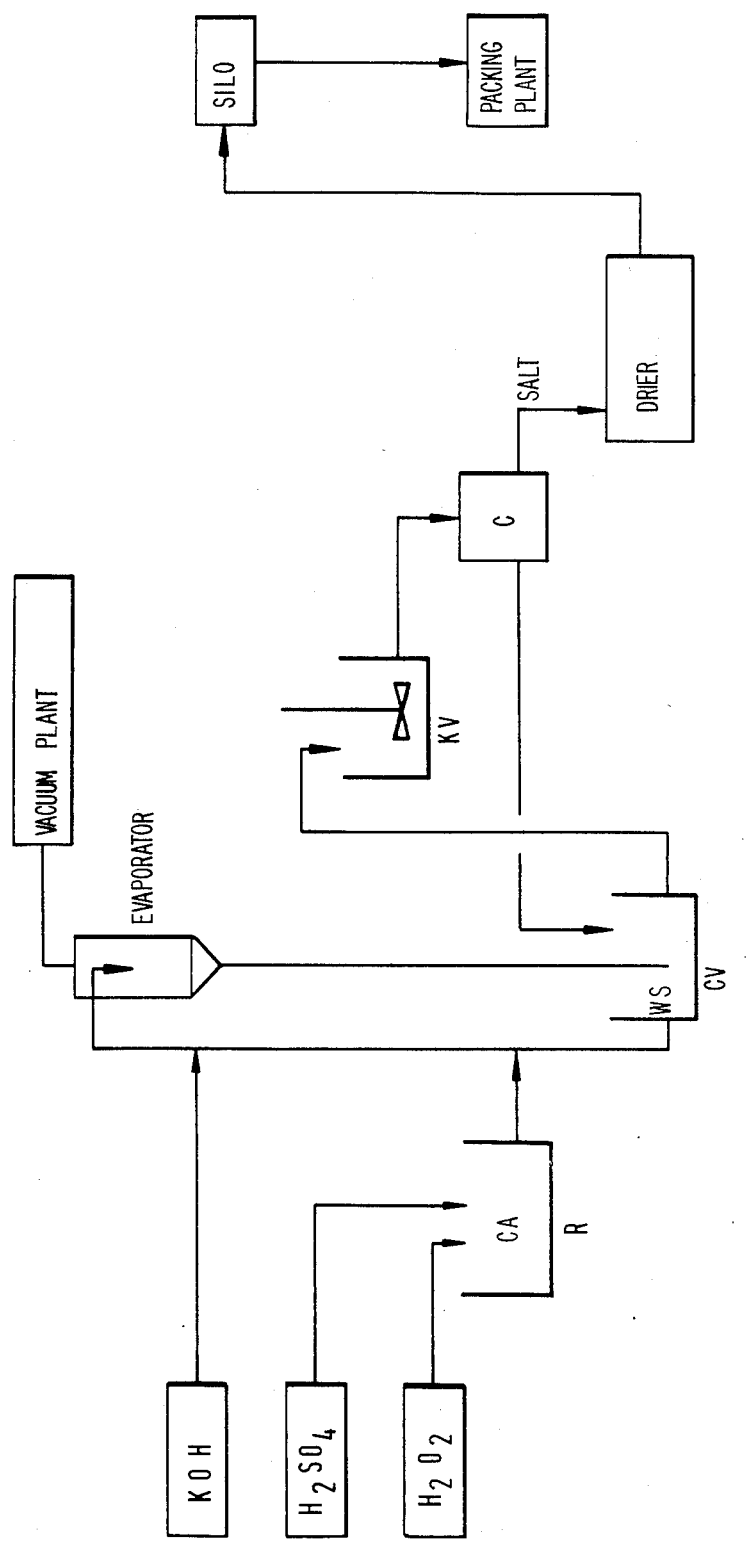

PROCESS FOR THE PRODUCTION OF POTASSIUM PEROXYMONOSULPHATE TRIPLE SALT

The present invention is concerned with a process for the production of potassium peroxymonosulphate triple set.

The salts of peroxymonosulphuric acid (Caro's acid) with the anion $HSO_5^-$ are of great technical importance, for example as bleaching agent for bleaching natural and synthetic fibres, in hair cosmetics for straightening or curling hair, in the production of leather, for cleaning agents, for example for dental prostheses, or as domestic cleaner, and especially also as a component of modern washing agents (cf., for example Federal Republic of Germany Patent Specification No. 32 46 260). However, of the salts of peroxymonosulphuric acid, only a few have been obtained in crystalline form because, in the case of crystallisation from aqueous solution by evaporation, considerable losses are to be expected due to decomposition. The simple alkali metal salts $NaHSO_5$ and $KHSO_5$ are hydroscopic upon standing in air. The triple salt $2KHSO_5.KHSO_4.K_2SO_4$, which is sometimes called "caroate", is stable in the air. This salt is, therefore, the only peroxymonosulphate which is produced on an industrial scale.

For the production of the triple salt $2KHSO_5.KHSO_4.K_2SO_4$, there must first be produced an aqueous solution of the components $KHSO_5$, $KHSO_4$ and $K_2SO_4$ by the reaction of sulphuric acid, hydrogen peroxide and an alkaline potassium salt, such as potassium hydroxide, potassium carbonate or potassium hydrogencarbonate, within a narrowly limited ratio of components. From such a solution, by evaporation or by simple crystallisation, there can, as a rule, only be obtained an impure form of the triple salt. For the production of the pure triple salt, a fractional crystallisation is necessary, which is technically laborious, results in losses of yield and, as a rule, requires a batch process which is also difficult to carry out (cf. Federal Republic of Germany Patent Specification No. 10 80 083; Austrian Patent Specification No. 212,275 and U.S. Pat. No. 3,041,139).

It is an object of the present invention to provide a process which can be carried out continuously for the production of the triple salt $2KHSO_5.KHSO_4.K_2SO_4$, which can be carried out simply and in an economic way and gives a triple salt with a degree of purity which corresponds to the requirements of the above-mentioned applications.

Thus, according to the present invention, there is provided a process for the production of the triple salt $2KHSO_5.KHSO_4.K_2SO_4$ from sulphuric acid, hydrogen peroxide and potassium hydroxide, wherein, for the continuous production, there is prepared an aqueous working solution which contains $KHSO_5$, $H_2SO_4$ and $K_2SO_4$ in a molar ratio of 1.3 to 2.5/1.2 to 2.0/1, which then is concentrated in an evaporation plant at reduced pressure and a temperature of at most 40° C. to a concentration which corresponds to a content of 20 to 30% by weight of $KHSO_5$, a partial stream is removed from the concentrated solution and from this, by cooling to a temperature below 15° C., the triple salt is precipitated and separated, the mother liquor obtained is combined with the remaining solution, the solution is reconstituted by the addition of 90 to 100% sulphuric acid, 30 to 90% hydrogen peroxide and concentrated aqueous potassium hydroxide solution and again recirculated to the evaporation plant.

According to the present invention, the triple salt can be produced in a simple and continuous manner. In the case of maintenance of a molar ratio, used according to the present invention, of $KHSO_5/H_2SO_4/K_2SO_4$ of 1.3 to 2.5/1.2 to 2.0/1, surprisingly, the triple salt precipitates immediately without previous precipitation of potassium sulphate, whereas in the case of a working solution which already has the composition of the triple salt, potassium sulphate must first be precipitated, for which reason, for the production of the triple salt, the water must be completely removed from such a solution, for example by means of a spray dryer. In contradistinction thereto, according to the process of the present invention, very little water has to be evaporated so that it is possible to save a considerable amount of energy and the process can also be carried out continuously.

According to the process of the present invention, it is also possible to avoid the disadvantageous content of about 3% peroxydisulphate which is present in commercial products; such a content of peroxydisulphate is especially disadvantageous for the use of the triple salt in cosmetic preparations because the peroxydisulphate, in contradistinction to pure potassium peroxymonosulphate and to the triple salt, has skin-irritant properties. Due to the use of 90 to 100% sulphuric acid instead of the oleum used according to known processes, this undesired content of peroxydisulphate can be avoided. A triple salt produced by the process according to the present invention only contains about 0.2% by weight of potassium peroxydisulphate.

A further advantage of carrying out the process according to the present invention is that the loss of active oxygen, i.e. the decomposition of the peracid, can also be reduced when carrying out the process continuously. We have ascertained that the decomposition of the peracid is mainly caused by chloride ions which are present in the starting material and especially in the aqueous potassium hydroxide solution. In the case of carrying out the process continuously, these chloride ions are normally enriched, which results in an increasing decomposition of the peracid. Under the reaction conditions employed according to the present invention, the chloride is present as hydrochloride as a result of the large excess of sulphuric acid and, after partial oxidation to chlorine by the Caro's acid, is continuously removed with the water as hydrogen chloride and chlorine to such an extent that decomposition of the peracid (reduction of the active oxygen) remains within acceptable limits. In addition, this is also favoured by working according to the present invention at low temperatures, whereas higher temperatures promote the decomposition.

For the reconstitution of the solution, there is advantageously used sulphuric acid with a concentration of more than 90 and less than 100% and especially approximately 95% sulphuric acid. The process makes use of a 30 to 90% and especially approximately 85% hydrogen peroxide and of a concentrated aqueous potassium hydroxide solution, preferably 50% aqueous potassium hydroxide solution. From the sulphuric acid and the hydrogen peroxide there is preferably first produced Caro's acid, $H_2SO_5$, which, simultaneously with the aqueous potassium hydroxide solution, is then added to the working solution.

The pressure in the evaporation plant is preferably less than 100 mbar and in particular between 25 and 2 mbar. The temperature in the evaporation plant is at most 40° C. and preferably between 30° and 15° C. and more preferably 20° to 25° C.

The precipitation of the triple salt from the solution commences at a temperature of about 15° C. However, the crystals are thereby obtained in an fine, powdery form. On the other hand, a good crystallisation with the formation of easily separatable crystals is achieved at temperatures of 10° C. and below. Therefore, the precipitation is preferably carried out at a temperature of from 10° C. to −10° C. and especially at 5° C. and below. The separation of the crystals can be carried out in a way usual for such a process step, for example by centrifuging or filtration.

The working solution is preferably one with a molar ratio of $KHSO_5/H_2SO_4/K_2SO_4$ of 1.8 to 2.2/1.4 to 1.7/1.

The following example is given for the purpose of illustrating the present invention. If not stated otherwise, statements of percentages given above and below are percentages by weight.

EXAMPLE (a) Starting materials

The raw materials used are 95% sulphuric acid, 85% hydrogen peroxide and 50% aqueous potassium hydroxide solution.

6 kg/hour hydrogen peroxide and 20 kg/hour sulphuric acid are continuously mixed together in a coolable reaction vessel (R) so that an approximately 50% Caro's acid ($H_2SO_5$) results which, in addition, also contains sulphuric acid, water and hydrogen peroxide.

(b) Production circuit

The production circuit, contains about 1.5 m³ of working solution (WS) with a content of 20 to 30% $KHSO_5$ and approximately 15% of sulphuric acid and potassium sulphate in aqueous solution. 5 m³/h of this solution, into which there are continuously introduced the Caro's acid (CA) (26 kg/hour) and 50% potassium hydroxide (27 kg/hour), are pumped from a circulation vessel (CV) via a vacuum evaporation plant at about 25° C. and 10 mbar in order to remove the water introduced with the raw materials and formed by the neutralisation.

About 0.2 m³/hour of working solution (WS) are continuously removed from the circulation and cooled in a coolable crystallisation vessel (KV) to 5° C., whereby the triple salt is precipitated.

(c) Separation

The crystal suspension from the crystallisation vessel (KV) is separated by means of a centrifuge (C). The filtrate (about 0.2 m³/hour) is returned to the circulation vessel (CV) and reconstituted. The filter cake is washed in the centrifuge and the moist salt is dried in a fluidised bed drier and passed via a silo to a packing plant.

FIG. 1 of the accompanying drawings schematically illustrates the course of the process.

We claim:

1. A process for the continuous production of a triple salt designated $2KHSO_5.KHSO_4.K_2SO_4$, from sulphuric acid, hydrogen peroxide and potassium hydroxide, comprising the steps of concentrating an aqueous working solution which contains $KHSO_5$, sulphuric acid and potassium sulphate in a molar ratio of 1.3 to 2.2/1.4 to 2.0/1, in an evaporation plant under reduced pressure and at a temperature of up to 40° C., to a solution containing 20 to 30% by weight of $KHSO_5$, removing a partial stream of solution from the remaining concentrated solution, cooling said partial stream to a temperature below 15° C. to precipitate the triple salt, separating the triple salt to leave a mother liquor, combining the mother liquor with the remaining solution, adjusting the remaining solution to said molar ratio of reactants by adding 90 to 100% sulphuric acid, 30 to 90% hydrogen peroxide and concentrated aqueous potassium hydroxide solution and recycling the reconstituted solution to the evaporation plant.

2. The process of claim 1, wherein a pressure of less than 100 mbar is maintained in the evaporation plant.

3. The process of claim 2, wherein in the evaporation plant there is maintained a pressure between 25 and 2 mbar and a temperature between 30+ and 15° C.

4. The process of claim 1 wherein the working solution is adjusted to a molar ratio of $KHSO_4$ to $H_2SO_4$ to $K_2SO_4$ of 1.8 to 2.2/1.4 to 1.7/1.

5. The process of claim 1 wherein the partial stream is cooled to a temperature between 10° C. and −10° C. to precipitate the triple salt.

6. The process of claim 1 wherein a pressure of less than 100 mbar is maintained in the evaporation plant and the partial stream is cooled to a temperature between 10° C. and −10° C. to precipitate the triple salt.

7. The process of claim 6 wherein the working solution is adjusted to a molar ratio of $KHSO_5$ to $H_2SO_4$ to $K_2SO_4$ of 1.8 to 2.2/1.4 to 1.7/1.

8. The process of claim 1 wherein the molar ratio range of sulphuric acid is 1.4 to 1.7.

9. A process for the production of a triple salt designated $2KHSO_5.KHSO_4.K_2SO_4$, comprising the steps of preparing a solution containing a molar ratio of $KHSO_5$ to sulphuric acid to potassium sulphate of 1.3 to 2.2/1.4 to 2.0/1 and wherein the $KHSO_5$ is present in 20 to 30% by weight;

cooling said solution to below 15° C. to precipitate said triple salt; and removing the triple salt precipitate from the solution.

10. The process of claim 9 wherein the molar ratio range of sulphuric acid is 1.4 to 1.7.

* * * * *

UNITED STATES PATENT AND TRADEMARK OFFICE
CERTIFICATE OF CORRECTION

PATENT NO. : 4,610,865
DATED : September 9, 1986
INVENTOR(S) : Wolfgang Reh et al It is certified that error appears in the above-identified patent and that said Letters Patent is hereby corrected as shown below:

Column 4, line 31, change "30+" to -- 30 --.

Signed and Sealed this

Tenth Day of March, 1987

Attest:

DONALD J. QUIGG

*Attesting Officer*      *Commissioner of Patents and Trademarks*